A. E. BARKER.
MACHINE FOR MAKING ROUND BELTING.
APPLICATION FILED JAN. 16, 1918.

1,345,907.

Patented July 6, 1920.
2 SHEETS—SHEET 1.

WITNESS
F. J. Hartman

INVENTOR
Alpheus E. Barker

BY
Fenton & Blount
ATTORNEYS

A. E. BARKER.
MACHINE FOR MAKING ROUND BELTING.
APPLICATION FILED JAN. 16, 1918.
1,345,907. Patented July 6, 1920.
2 SHEETS—SHEET 2.
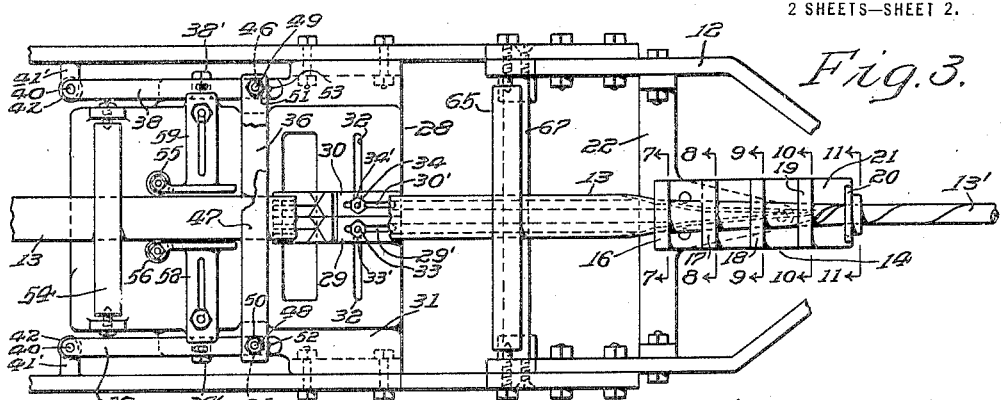
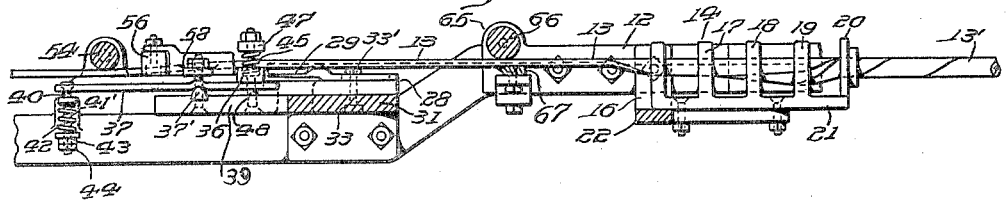
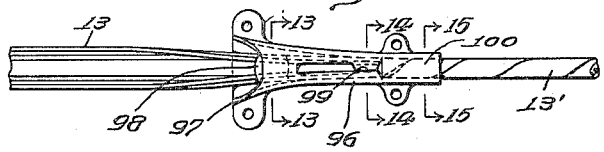
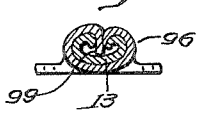
INVENTOR
Alpheus E. Barker.
WITNESS
F. J. Hartman.
BY
ATTORNEYS

UNITED STATES PATENT OFFICE.

ALPHEUS E. BARKER, OF PHILADELPHIA, PENNSYLVANIA, ASSIGNOR TO ALEXANDER BROTHERS, OF PHILADELPHIA, PENNSYLVANIA, A CORPORATION OF NEW JERSEY.

MACHINE FOR MAKING ROUND BELTING.

1,345,907.     Specification of Letters Patent.     Patented July 6, 1920.

Application filed January 16, 1918. Serial No. 212,030.

*To all whom it may concern:*

Be it known that I, ALPHEUS E. BARKER, a citizen of the United States, and a resident of Philadelphia, county of Philadelphia, State of Pennsylvania, have invented a certain new and useful Machine for Making Round Belting, of which the following is a specification.

The present invention relates to a machine for manufacturing what is known in the trade as round belting, such as belting made from leather or any other suitable material, formed, folded or shaped from a strip, usually in a more or less flat form, into a belt which is substantially circular in cross section.

Round belting of various materials of this character have heretofore been made by hand and it is the broad object of this invention to provide a machine for making such round or substantially round belting mechanically, or to provide a mechanical instrumentality or means for producing that which was previously made by hand with the added result that an improved product is manufactured, a vast saving of material is accomplished and, moreover, it is possible to make certain sizes of belting which could not previously be made at all or which could only be made with great difficulty.

Various instrumentalities and association of means could be utilized for carrying my invention into practice and the means disclosed herein as one embodiment of the invention could be widely varied within the range of this invention which contemplates broadly the provision of any mechanical means properly associated as may be necessary—one combination of elements being disclosed herein for the purposes of illustration—to perform mechanically the operation of making a rounded belt from a strip of material, it being evident that the particular means shown herein is not essential to the broad invention and that any means for performing the necessary operation and obtaining the results herein set forth falls within the scope of the machine illustrated herewith.

Figure 1:
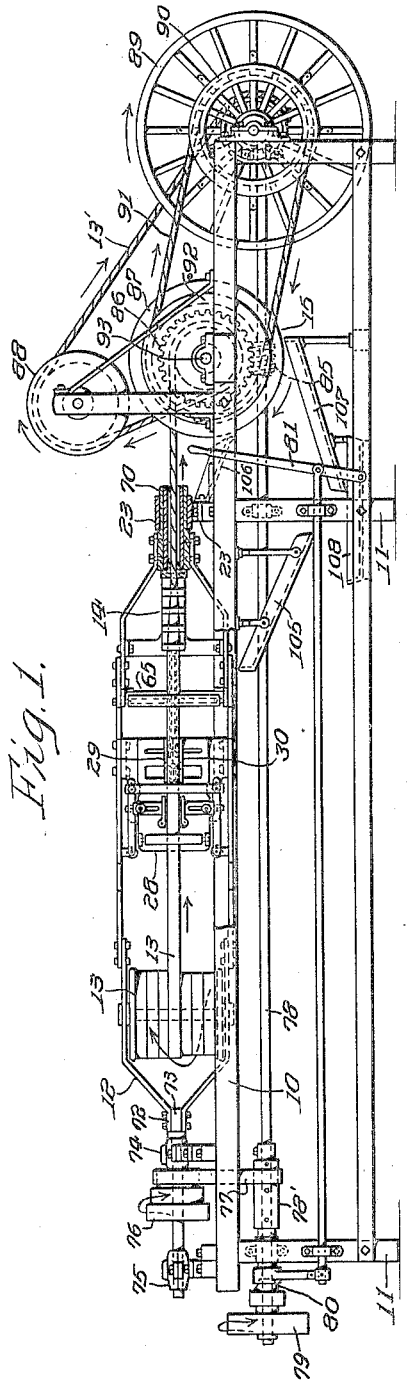
Figure 2:
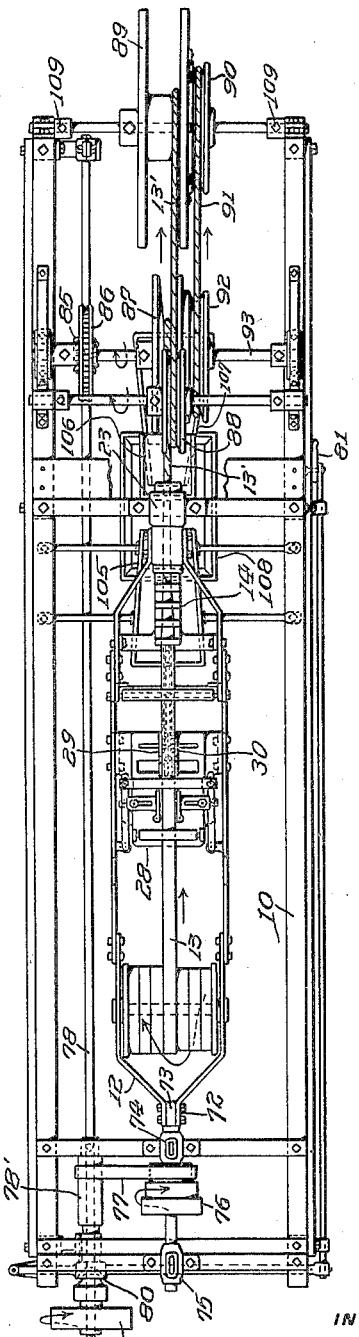

Referring to the drawings, Figure 1 represents a side elevation of one embodiment of the invention, while Fig. 2 is a plan view corresponding to Fig. 1 with certain parts shown in a different position. Fig. 3 is an enlarged plan view showing the association of certain operating parts, while Fig. 4 is a side view similar to Fig. 3 with parts shown in section. Figs. 5 and 6 show details of parts which may be used with this invention, while Figs. 7, 8, 9, 10 and 11 are sectional views on the lines 7—7, 8—8, 9—9, 10—10 and 11—11 of Fig. 3. Fig. 12 shows a modified form of a certain operating part of the machine disclosed herein while Figs. 13, 14 and 15 are sectional views on the lines 13—13, 14—14 and 15—15 of Fig. 12.

For the purposes of illustrating one embodiment of this invention in a machine for making round belting mechanically instead of by hand, there is shown in the drawings a platform or frame 10 suitably supported by legs 11, said frame constituting means for carrying or supporting the operating parts of the machine illustrated herein. On the platform 10 may be located a suitable rotatable frame 12 adapted to carry a roll of flat, or relatively flat, belting material 13 and a suitable forming mechanism 14 and by providing means such as illustrated generally at 15 for drawing the material off the roll 13 through the revolving forming mechanism 14, there is associated one means for mechanically forming a rounded belt from a supply of generally flat material therefor. The forming mechanism 14 may be constructed in any manner to give the proper shape to the material as it passes through the same and by causing a relative rotational movement between the supply of flat material at 13 and the completed rounded belt, there is provided means for helically laying the material 13 into a rounded belt as it passes through the forming mechanism 14.

As more clearly shown in Figs. 3 and 7 to 11 inclusive, one embodiment of forming mechanism may comprise a plurality of sections 16, 17, 18, 19 and 20 provided with openings 16', 17', 18', 19' and 20' of the shape illustrated in Figs. 7 to 11 through which the belting material is progressively drawn and thereby made to eventually assume a substantially rounded contour of the desired character. The section 16, it will be seen, folds the edges of the belt material at right angles to the face while each of the succeeding sections further shapes the material in the manner clearly indicated in Figs. 8 to 11. Each of the sections, which may be made of metal or any other suitable material, may be in one piece secured to a suitable supporting base 21, which, in turn, may be secured at one end to a cross piece 22 on the frame 12 and rest at its other end adjacent a bearing 23 within which one end of the frame 12 is adapted to revolve.

Although not essential to the machine of the present invention, there may be provided between the roll of material 13 and the forming mechanism 14 certain other operating mechanisms adapted to coöperate with the broad mechanism of this invention to assist in forming the round belting from the flat material or otherwise improve the results obtained. For example, it is desirable to make certain grooves in the inner surface of the flat strip before it is folded and laid into the round belting in order to facilitate these operations and I have illustrated herewith means to provide two grooves in the material, one adjacent either edge thereof, thus permitting the strip to be more readily formed into the completed article. One embodiment of such a mechanism is shown in the drawings at 28, wherein a plurality of grooving knives 29 and 30 are adapted to be suitably located in the path of movement of the material 13 to form therein any suitable grooves that may be desired. The knives 29 and 30 are provided with elongated slots 29' and 30' to form means to adjustably secure the knives in proper position on a cross piece 31 which in turn is provided with a transverse elongated slot 32. Bolts 33 and 34 are adapted to pass through the slots in the knives and the slot 32 in the cross piece 31 to clamp the knives in proper position by the nuts 33' and 34' for each bolt 33 and 34. By reason of the slot 32 the knives may be adjusted farther apart or nearer together to accommodate wider or narrower strips of material for forming the belt, and, moreover, the distances from the edges of the strip at which the groove on the underside of the belt is formed, may likewise be adjusted as desired. The form of the knife is shown more clearly in Figs. 5 and 6 wherein it will be seen that one form of cutting surface may be made by forming the forward edge of the knife 29 into a peaked sharpened edge 35 properly shaped to groove or gouge out any corresponding form of groove deemed necessary. A ledger blade 36 may be arranged under the strip of material just before the same reaches the cutting knives 29 and 30 to properly gage the depth of the groove cut by the knives. One means for adjustably tensioning the ledger blade 36 in proper position is by connecting the same to certain pivoted side arms 37 and 38 fulcrumed at 37' and 38' to a member or projection on the bed plate 39 formed as a part of the cross piece 31. One end of each of the levers 37 and 38 is provided with a bolt or stud 40 adapted to pass through a projecting lug 41' on the frame 12. A coil spring 42 is interposed between the lug 41' and an adjustable nut 43 on the bolt 40. A lock nut 44 may be used to position the nut 43 in any location desired to give a proper tension to the spring 42 which operates on the end of the levers 37 and 38 tending to move the same about their respective pivots and thereby cause the ledger blade 36 to engage the strip of material 13 and gage the depth of the groove cut or determine the proper operative position for the cutting knives 29 and 30. The ledger blade 36 is adapted to be thus operatively held against the underside of the strip 13 with any desired amount of tension and there may be provided means to move the ledger 36 in the opposite direction such as the springs 45 and 46 bearing on the upper side of the ledger 36 on one end with their other ends bearing against a transverse bar 47 whose position is adjustably secured on the bolts 48 and 49 by the nuts 50 and 51, the bolts 48 and 49 passing through an opening in each end of the ledger blade 36, slots 52 and 53 in the pivoted arms 37 and 38, respectively, and into a portion of bed plate 39. In order to suitably position the strip of material 13 centrally of the cross piece 31 or in proper position to engage the knives 29 and 30, regardless of what portion of the roll of material the strip 13 is unwinding from, there may be provided a roller 54 located substantially parallel to the bed plate 39 adapted to engage the upper flat surface of the strip 13 and a plurality of adjustable rollers 55 and 56 located at substantially right angles to the bed plate 39 and adapted to engage the edges of the strip 13. The rollers 55 and 56 may be carried by adjustable brackets 58 and 59 having therein suitable slots so as to be adjustably secured by bolts to the bed plate 39 to accommodate different widths of strips 13. It is evident that various other forms of grooving devices could be employed other than that described herein and the particular mechanism disclosed for performing this operation may be varied widely in detailed construction.

It may be desirable to also provide between the roll of material 13 and forming mechanism 14, a leveling mechanism illustrated generally at 65 shown in Figs. 1, 2, 3 and 4, in order to make the strip of material entering the forming mechanism 14 of substantially the same thickness transversely thereof throughout its length in order to further assist in the production of a substantially uniform completed article. One means for accomplishing these ends is shown more clearly in Figs. 3 and 4 in a roller 66 adapted to engage the upper surface of the strip 13 and a shaving knife 67 adapted to engage the under surface thereof. The roller 66 and blade 67 may be relatively adjustable, if desired, to accommodate different thicknesses of strips of material 13, and it will be seen that as the strip 13 passes through the leveling mechanism the blade 67 operates to shave off the thicker portions of the material and maintain a uniform thickness of strip as presented to the forming mechanism 14.

As hereinbefore stated, one embodiment of a machine adapted to form a rounded belting from a strip of relatively flat material thereof constituting the present invention, includes means to draw the material through a forming mechanism, there being effected at the same time a relative rotary motion between the material 13 and the completed belting. Referring to Figs. 1 and 2, it will be seen that, in the mechanism illustrated, the material 13 passing through the forming mechanism 14 is drawn through the hollow shaft 70 supported in the bearing 23 previously referred to, the shaft 70 being secured to and forming the means for supporting one end of the frame 12 to permit its rotation. The other end of the frame 12 is joined at 72 to a shaft 73 supported in a bearing 74 on the platform 10. The shaft 73 may be provided with a further bearing 75, if desired, and between these bearings may be located a step pulley 76 adapted to be driven by a belt 77 from a shaft 78 having a pulley 78', which in turn may be driven from a source of power applied to the pulley 79. A clutch 80 may be interposed between the driving pulley 79 and the shaft 78, which clutch may be controlled manually from the handle 81 by a system of levers in any well-known manner. Any other source of power for driving the shaft 73 or rotating the frame 12 could, of course, be readily substituted for that just described.

One means for drawing the belting through the forming mechanism, as the belting is being folded and twisted, and a source of power therefor, is shown in Figs. 1 and 2, where the shaft 78 may be extended longitudinally of the machine and be provided at its other end with a worm 85 adapted to engage a worm gear 86 and drive a drum 87 which draws the completed shaped belting from the frame 12 through the forming mechanism 14 and hollow shaft 70. An auxiliary drum 88 is located above the drum 87 receiving the belting therefrom and delivering the same to a take-up roll, or, tensioning and carrying wheel 89. The take-up wheel may be rotated by a pulley 90 driven by a belt 91 from a driving pulley 92 which in turn may be driven from a shaft 93 upon which the drum 87 and worm gear 86 are located. The belt 91 may have a certain amount of slip, if desired, in driving the wheel 89 for a purpose that will hereinafter appear.

The operation of the machine illustrated herewith will, it is believed, be readily understood from the foregoing description. If a leather belting is being manufactured, a roll of material 13 is placed in the frame 12, the leather being in a moist or sammied condition. The material is first passed through the grooving mechanism 28, the leveling mechanism 65, the forming mechanism 14 through the hollow shaft 70 around the drum 87 to the drum 88, hence to the take-up wheel 89. Any method may be employed for first getting the material through the mechanism. The power is then turned on or the clutch 80 thrown into operation to drive the shaft 78. By reason of the belting 77, which is connected to the driving pulley 76, the shaft 75 and hence the frame 12 is then made to revolve. At the same time the worm 85 drives the worm gear 86 and rotates the drum 87. The material is therefore drawn at any desired tension from the frame 12 as the same passes from the roll 13 through the grooving mechanism 28, the leveling mechanism 65 and through the forming mechanism 14. The rate at which the material passes out of the shaping frame may be made to bear such a relation to the speed of rotation of the frame 12 as to obtain the desired number of convolutions to the belt per unit of length in order to produce a substantially solid round belting of the correct tension, being neither too loose nor too tight. By reason of the pull of the drum 87, as well as the auxiliary drum 88, and wheel 89, it may be seen that a certain amount of tension may be applied to the belting as it passes through the forming mechanism 14 and a completed helically laid belting may be made which, while it may have a certain amount, will not have an unreasonable or objectionable amount of stretch therein, and, moreover, by the association of means, there will be obtained from a given length of roll of material 13 substantially the same amount of completed rounded belting by reason of the application of a proper amount of pull or tension on the material from the drum 87 which may be varied in any manner desired, in this case, by mechanism dependent upon the speed of its rotation in view of the particular embodiment of the machine disclosed herein.

The action of the forming device is to "helically lay" rather than "twist" the leather strip. The frame carries a spool or reel and is connected with the forming means whereby both rotate together or simultaneously so that no "twist", in the ordinary sense of the term, is imposed upon the strip running from the supply on the reel through the forming device to the take-up device. The helical formation or laying action is accomplished by the peculiar configuration of the elements forming part of the forming means, such elements also operating at the same time to turn in the borders or edges of the strip and otherwise form the belt into the peculiar shape shown on the drawing. As the strip is given a longitudinal movement simultaneously with the rotation of the forming device a resultant relative helical movement occurs between the forming device and the product operated upon. During such relative movement the forming elements in the forming device gradually force or move the strip portions into proper position to finally form the round belt illustrated on the drawing.

In the embodiment shown in Figs. 3, 4 and 7 to 11 of the forming mechanism, it will be noted that the material is first folded in the section 16 at either edge, the folds occurring at the points at which the strip has been previously grooved by the grooving mechanism 28. Each of the next succeeding sections 17, 18 and 19, further fold and turn the material in order to adapt it to assume its final form, and, it appears that, when the material passes from the section 19 to the section 20, the section 20 being merely provided with a circular opening, the material is helically laid into its circular form by reason of the fact that the entire frame 12 carrying the roll of material 13 and forming mechanism 14 is revolving, while the round belt 13', as it passes through the bearing 70 on to the drum 87, is held from rotating. Thus a shaping action is obtained between the material 13 in its flat condition and the completed rounded belt 13'. It is evident that the same result might be obtained by retaining the frame 12 stationary and revolving the means used to draw the material through the forming mechanism. It is further evident that the mechanism disclosed herewith could be used to merely shape the belt without previously folding the same, if desired.

Although not necessarily essential to the invention, the winding drum 87 and the auxiliary drum 88 may be used, if desired, to effect the added function of straightening out any possible irregularities in the belting 13' as it comes from the twisting mechanism and thus result in the production of a more uniform product. The drum 87 may, therefore, be employed to assist in obtaining these added results as well as used as a means for drawing the material through the shaping or forming mechanism.

By reason of the use of the step pulley 76, it is seen that the speed of the rotation of the frame 12 may be varied. When a narrower or thinner material is used and a round belt of smaller diameter produced, then the frame 12 should revolve at a higher rate of speed since the smaller diameter of belt has a larger number of convolutions per unit of length and the material is being withdrawn from the forming mechanism at a uniform rate of speed. The proper rates of speed at which the frame 12 should be revolved relative to the rate at which the material is being drawn through the frame may be readily ascertained and the machine adjusted accordingly. It is evident that the drum 87 could be rotated from any source of power desired independently of the shaft 78 or the source of power which is used to rotate the frame 12, it being merely necessary to provide means to properly determine the relative rates of speed at which the frame 12 revolves and at which the drum 87 rotates. Moreover, any desired amount of tension may be applied—as by the drum 87—to the belt as it is being shaped and hence the amount of stretch which the completed belt may have may be reduced to a minimum or to any desired amount and moreover, as indicated, the resulting product obtained from a given length of flat material in the roll 13 may be made to attain substantially the same length, thus resulting in the saving of a substantial amount of material over that obtained from the hand methods heretofore employed where a longer strip of flat material 13 was necessary to produce a certain length of completed belting.

In the modification shown in Figs. 12 to 15 inclusive, the forming or shaping mechanism is shown as a continuous member 96 formed in the shape of a tube flared, as at 97, at one end and provided with an inwardly extending suitably shaped lug 98 to fold the material in the manner indicated in Fig. 13, while toward the other end of the same there may be provided a narrower extension 99 extending inwardly from the tube 96, as shown in Fig. 14. The contour of the walls of the tube 96 is correspondingly shaped from the end 97 to the end 100 as illustrated in Figs. 13, 14 and 15, and it will be seen that the forming mechanism illustrated in Fig. 12 will operate substantially as that shown in Figs. 3, 4 and 7 to 11. Moreover, it is apparent that various other forms of forming mechanisms could be readily arranged by any person skilled in the art to which this invention appertains and the invention is in no wise limited to the form of mechanism illustrated in either of these embodiments.

In view of the fact that the material operated upon is in a moist condition and when shaped the moisture is forced out of the material, I have provided a series of pans 105, 106, 107 and 108 properly arranged and positioned to carry this water down into the receiving pan 108 by which it may be readily removed from the machine.

Reference is made to the take-up wheel 89 which may be readily removed from the machine, if desired, by loosening one of the set screws 109 which holds its shaft in position and sliding the shaft first in one direction and then in the other to completely withdraw the wheel and shaft from the machine. It will be further noted that this wheel 89 in the form of mechanism described, has the further utility of providing the gripping surface about which the material 13' is wound in order that the drum 87 and auxiliary drum 88 may be effective to pull the material through the forming frame. The material 13' as it is lapped on the wheel 89 is firmly held therein so that the drum 87 is effective as stated. Moreover, the ultimate effect of the drawing action or the double tension on the material as it leaves the frame, may be varied by varying the speed at which the wheel 89 rotates as well as changing the speed of rotation of the drum 87. The belt 91, as has been stated, may be permitted to slip a certain amount in driving the wheel 89 for the purpose of varying this tension as just stated, and also for the purpose of causing the wheel 89 to vary its tensional speed as the material 13' is lapped around the hub thereof, since it is apparent that if the speed of the wheel 89 were constant when a large amount of material is on the hub, then the wheel 89 would take the material away from the auxiliary drum 88 and tensioning drum 87 faster than would be desirable, hence, by permitting of a certain amount of slip between the belt 91 and pulley 90, the take-up wheel 89 may operate to apply a given amount of tension and receive the material 13' at a uniform rate regardless of the diameter of the material lapped on the hub of the wheel.

Having thus described my invention, I claim and desire to protect by Letters Patent of the United States:

1. A machine for making round belting including a forming mechanism adapted, during operation, to properly shape a belting from a supply of material passed therethrough, means for effecting a relative movement between said forming mechanism and the shaped belting, means to draw said material through said forming mechanism and means for varying the relative rates of speed at which said last two mentioned means operate.

2. A machine for making round belting including a forming mechanism adapted, when operated, to properly shape a belting from a supply of material passed therethrough, means for effecting a relative movement between said forming mechanism and the shaped belting, means to draw said material through said forming mechanism and means to vary the rate at which the means for effecting said relative movement operates.

3. A machine for making round belting from a relatively flat strip of leather-like material, including means for grooving the strip, means for folding the strip, means for helically shaping the folded strip and means for drawing the folded strip through said grooving, folding and shaping means.

4. In a machine for making round belting from a strip of material, including means for grooving the strip, means for folding the grooved strip, means for helically shaping the folded strip and means for applying a tension to said strip for the purposes indicated.

5. A machine for making round belting from a strip of material including means for folding the strip, means for shaping the folded strip, means for applying tension to said strip, means to draw said strip through said folding and shaping means and means to vary the rate of speed at which said drawing means operates relative to the speed at which said folding and shaping means operate.

6. A machine for making round belting from a strip of material including means for folding a strip, means for helically shaping the folded strip, means for drawing said folded strip through said folding and shaping means and straightening means coöperating therewith to produce a smooth, uniform twisted belt of the character indicated.

7. In a machine for making round belting from a strip of material, including means for grooving the strip, means for folding the grooved strip, means for helically shaping the folded strip and means for applying a tension to said strip while thus being operated upon.

8. In a machine for making round belting from a strip of material, means for grooving the strip, means for helically shaping the grooved strip and means for drawing said strip through said grooving and shaping means, said grooving means including a pair of knives positioned in the path of movement of said strip of material and a ledger blade adapted to gage the grooving action of said knives.

9. A device for grooving leather including a supporting base, a grooving knife secured thereto, said grooving knife being shaped according to the shape of the groove to be cut, a ledger blade operatively associated therewith for governing the depth of the groove cut by said knife and means for maintaining said ledger blade in operative position.

10. A device for grooving leather including a supporting base, a grooving knife adjustably secured thereto, a ledger blade operatively associated therewith for governing the depth of the groove cut by said knife and means for maintaining said ledger blade in various adjusted positions whereby a groove of any desired depth may be cut.

11. A device for grooving leather including a supporting base, a grooving knife adjustably secured thereto, a ledger blade for governing the depth of the groove cut by said knife and means to adjust said knife to and from said ledger blade.

12. A device for grooving leather including a supporting base, a pair of grooving knives adjustably secured thereto, a ledger blade operatively associated therewith for governing the depth of the grooves cut by said knives and means for maintaining said ledger blade in various adjusted positions whereby grooves of any desired depth may be cut.

13. A grooving device for grooving leather including a supporting base, grooving knives secured thereto, a ledger blade adapted to govern the depth of the grooves cut by said knives, a pair of pivoted levers for supporting said blade and adjustable means tending to move said blade on said pivoted levers in opposite directions to properly gage the depth of grooves cut by said grooving knives in the material.

14. In a grooving device for grooving leather, the combination of a supporting base, a pair of grooving knives carried thereby, a ledger blade operatively associated therewith, a pair of pivoted levers carrying said ledger blade, an adjustable spring for each of said levers tending to move said levers in one direction and adjustable means tending to move the ledger blade in the opposite direction.

15. In a machine for making round belting from a strip of leather, the combination of a rotatable frame adapted to carry a supply of leather strip material, groove cutting means attached to said frame to rotate therewith and adapted to form grooves in said strip, a forming device attached to said frame and rotatable coaxially therewith, said forming device including means for laying said strip into a helical form simultaneously with the forming of said strip by said forming device and means to draw said strip in complete form from said forming device.

In witness whereof, I have hereunto set my hand this 15th day of January, A. D. 1918.

ALPHEUS E. BARKER.